United States Patent [19]
Bresler et al.

[11] Patent Number: 6,115,140
[45] Date of Patent: Sep. 5, 2000

[54] METHOD AND SYSTEM FOR HALF TONE COLOR CONVERSION

[75] Inventors: Yoav Bresler, Tel Aviv; Pavel Nosko, Ra Anana, both of Israel

[73] Assignee: Shira Computers Ltd., Kfar Saba, Israel

[21] Appl. No.: 09/123,537

[22] Filed: Jul. 28, 1998

[51] Int. Cl.$^7$ .............................. H04N 1/52; G06T 5/30
[52] U.S. Cl. ........................ 358/1.9; 358/534; 382/257
[58] Field of Search .......................... 358/1.9, 518, 525, 358/534, 536

[56] References Cited

U.S. PATENT DOCUMENTS

| | | | |
|---|---|---|---|
| 5,258,854 | 11/1993 | Eschbach et al. | 358/518 |
| 5,483,351 | 1/1996 | Mailloux et al. | 358/1.9 |
| 5,680,485 | 10/1997 | Loce et al. | 358/1.9 |
| 5,696,842 | 12/1997 | Shirasawa et al. | 382/257 |
| 5,812,695 | 9/1998 | Dawe et al. | 358/534 |

*Primary Examiner*—Scott Rogers
*Assistant Examiner*—Gholam A. Behpour
*Attorney, Agent, or Firm*—Mark M. Friedman

[57] ABSTRACT

A method and a system for color converting an HT image according to a desired color conversion. The method includes the steps of dilating the HT image to form a dilated HT image, converting the original HT image and the dilated HT image to CT images, color converting the CT image from the original HT image to form a converted CT image, and then using the CT images as a guide to interpolate between the dilated and the original HT images.

21 Claims, 12 Drawing Sheets

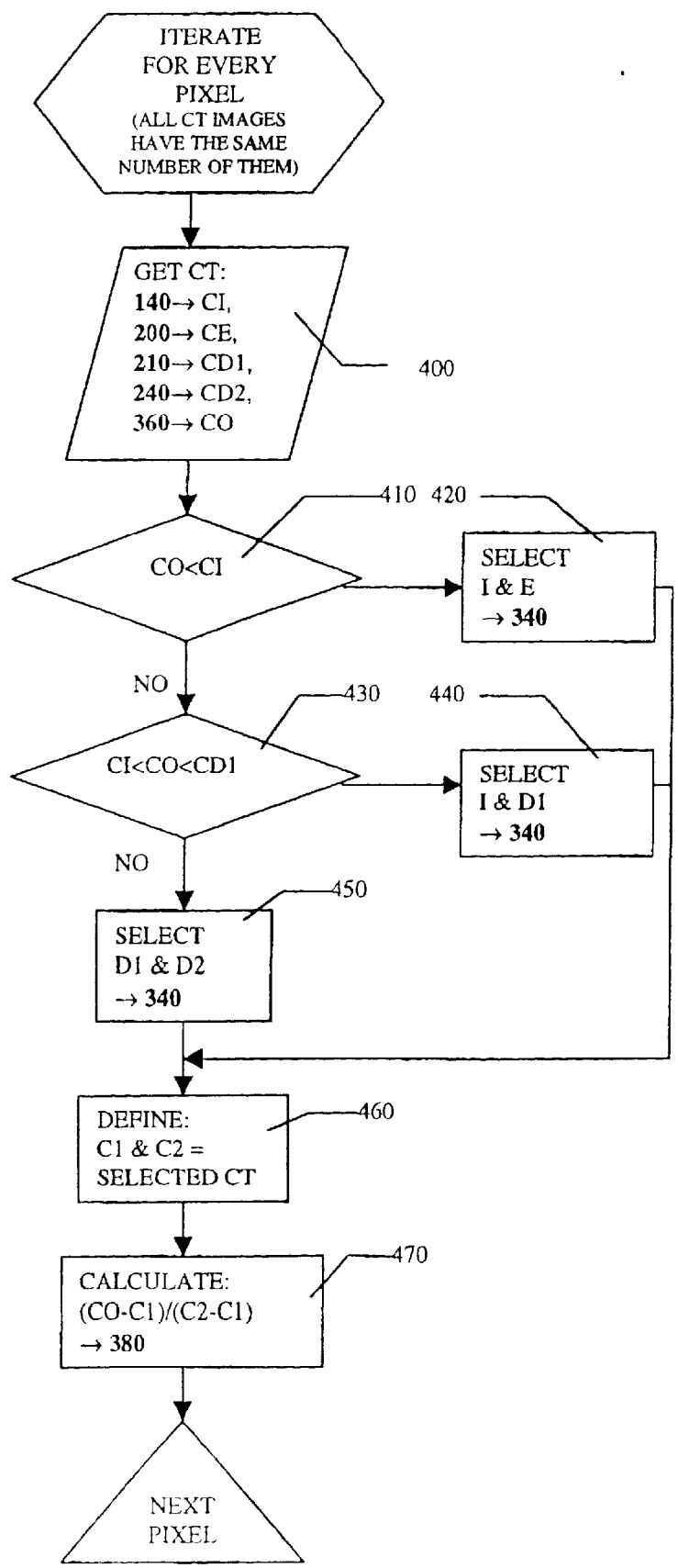

FIG. 6C
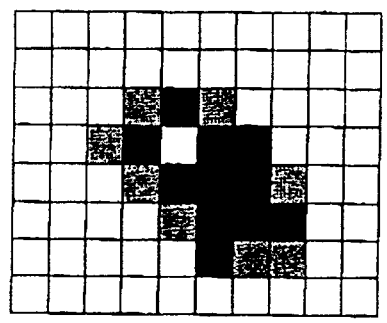
FIG. 6D
```
0000000000
0000000000
0000100000
0001011000
0000111000
0000011100
0000010000
0000000000
```
FIG. 6E
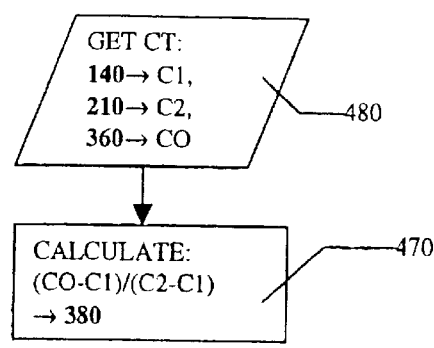

METHOD AND SYSTEM FOR HALF TONE COLOR CONVERSION

FIELD AND BACKGROUND OF THE INVENTION

The present invention relates to a method and system for color conversion of halftone images, and in particular, to a method and system which eliminates distortions caused by color conversion of such halftone images.

Images are often digitally coded as two-dimensional arrays of picture elements (pixels). In order to represent every color in the image, the images are coded according to separations, which are used to determine the color of each pixel. A pixel is a plurality of words, each word being the digital representation of one separation at one picture element. These words are usually integer variables. Thus, the color of each pixel is determined according to the combination of words used to code the separations of the pixel.

Images are commonly coded with three separations named Red, Green and Blue, or with four separations named Cyan, Magenta, Yellow and Black. Four separation images are particularly useful in preparing images to be printed on printing presses, and printing presses often use four inks named Cyan, Magenta, Yellow and Black in order to effectively reproduce the colors of the digitally coded image.

However, some images contain only one separation. A one separation array of one separation pixels may represent, for example, a black & white image, or it may represent an image consisting of various levels of gray. In other cases, a one separation array of one separation pixels may serve to carry information regarding one particular separation out of a plurality of such arrays describing a multi-separation image.

Two commonly used methods for digital image coding are the halftone and continuous tone methods. The halftone method codes an image according to words of one bit only, such that each word can only have two possible values. These values are 0 and 1 as binary numbers, but they are often interpreted as representing black and white. In some implementations 0 represents white and 1 represents black, and in others the opposite is true. In either case, images coded according to this method are often called "halftone" (HT) or "bitmap" images.

A halftone or bitmap image is composed of only black and white elements. However, when an image is printed, and becomes viewable by a human observer, each pixel is usually very small in size, and the fine detail of the boundaries between pixels is often lost to the human eye. In this case, the human eye observes continuously varying levels of gray. Areas containing a relatively high density of black pixels appear darker, while areas containing a relatively low density of black pixels appear lighter.

Continuous tone (CT) images are coded with words of more than one bit, so that each word more than two possible values. Often each word is of 8 bits (one byte), and represents 256 possible values. In this case the 256 values are often interpreted as representing 256 shades of gray from black to white. In some implementations 0 represents white and 256 represents black, and in others the opposite is true. Other continuous tone coding methods are also possible.

Therefore, a halftone image is coded as arrays of bits, in which each pixel is represented by a plurality of bits or Boolean variables, each having only two possible values, for example: 0 or 1, true or false, black or white, light or dark. By contrast, a continuous tone image is coded as an array of words, in which each pixel is represented by a plurality of words. Each word has more than two possible values, and commonly has 256 possible values, for example.

Halftone or bitmap images are of particular importance to the printing industry, as many useful printing processes can handle only half tone images, and are unable to print continuous tone images. On the other hand, many useful printing processes, and many display technologies, can only produce CT images, and cannot produce sufficiently small picture elements to represent images as an array of binary pixels.

Both CT and HT coded images are often processed and stored as arrays of pixels, in which case they are both often called raster images. There are many benefits for processing and storing images in digital form, and so this practice of processing and storing images as arrays of pixels is now widespread. One important kind of digital image processing is color conversion. Color conversion is defined herein as a process which operates on a pixel by pixel basis, so that each pixel is processed individually, without any effect on any other pixels. Thus, the more general color conversion "T" on a pixel "P" can be described by Equation 1.

$$P'=T(P) \qquad \text{Equation 1:}$$

Each pixel has been defined as a plurality of words, as in Equation 2.

$$P=\{W_1,W_2,\ldots,W_n\} \qquad \text{Equation 2:}$$

This yields the definition of a general color conversion as described by Equation 3.

$$P'=T(W_1,W_2,\ldots,W_n) \qquad \text{Equation 3:}$$

Thus defined, a color conversion is very useful when applied to CT images, and indeed is widely used for such images. Often, the color conversion is implemented by a set of look-up-tables.

However, such a color conversion is not as useful when applied to HT images. For example, for one-separation images, there are only 4 possible color conversions: one yield an all 0 image, one yield an all 1 image, one does not change the image at all, and the last negates the image.

Therefore, a process is required for color changes of HT images which is equivalent to the color conversion process for CT images. One possible implementation of such a process would involve converting an HT image to a CT image, performing the color conversion process on the CT image, and then converting the CT image back to the HT image. The process of conversion of a CT image to an HT image is commonly known as "screening" ("S"). As defined herein, the process of conversion of an HT image to a CT image is "descreening"("DS"). Both operations seek to produce a pair of images, one HT and one CT, which are substantially indistinguishable to a human observer if fine details of the images are not inspected too closely. Thus, this implementation of the color conversion process for HT images can be defined as follows.

First 'DS' Step: convert HT to CT

Second 'T' Step: affect color conversion of CT, as in Equation 1

Third 'S' Step: convert CT to HT

Unfortunately, a straightforward implementation of this color conversion process on HT images has the drawback of loss of information in the conversion from the original HT image to the CT image. A screening step which recovers this information is difficult to construct. For example, many HT images contain clusters of pixels of the same color, and the shape of these clusters is important to the quality of the image. The distance between clusters is also important, and may be constant or randomly variable. Both the shape of the clusters and the distance between them, as well as the existence of any clusters of the same color pixels, are lost in the process of DS. Thus, such an implementation of the process of color conversion of the HT image clearly has many drawbacks.

There is therefore a need for, and it would be useful to have, a color conversion method and system which operates on HT images with minimal loss of HT specific information, and which enables the color conversion process to be variable and user defined, for example through the specification of a set of lookup-tables.

SUMMARY OF THE INVENTION

It is one object of the present invention to provide a method and a system for color converting an HT image.

It is another object of the present invention to provide such a method which maintains the important features of the HT image.

These and other objects of the present invention are described in further detail in the following description, Figures and claims.

The present invention is related to a method and an apparatus for color converting an HT (halftone) image to a color converted HT image, by dilating the HT image according to the desired density of the color converted HT image.

According to the present invention, there is provided a method for color converting an original HT (halftone) image to a color converted HT image, the method comprising the step of dilating the original HT image according to a function of a relation between a density of the original HT image and a density of the color converted HT image to obtain the color converted HT image.

Preferably, the step of dilating further comprises the steps of: (a) dilating the original HT image to obtain a dilated HT image; (b) comparing a region of the original HT image and a region of the dilated HT image according to a comparison process, each of the regions corresponding to a pixel of the original UT image or of the dilated UT image; and (c) selecting one of the pixel of the original HT image or the pixel of the dilated HT image to form a selected pixel, the selected pixel forming at least a portion of the color converted HT image.

More preferably, the comparison process further comprises the steps of: (i) descreening the original HT image to produce a first CT (continuous tone) image; (ii) descreening the dilated HT image to produce a second CT image; (iii) performing a color conversion process on the first CT image according to the desired color conversion to produce a color converted CT image; (iv) comparing each pixel of the color converted CT image, the second CT image and the first CT image to select a CT image pixel from one of the second CT image and the first CT image; and wherein the step of selecting is performed by (i) merging each pixel of the original HT image and the first dilated HT image according to the selected CT image pixel to produce the color converted HT image.

Most preferably, the step of comparing the converted CT image, the second CT image and the first CT image further comprises the steps of: (1) obtaining a pixel from an equivalent coordinate location in the original HT image, the pixel being H1, and in the first dilated image, the pixel being H2; (2) calculating a weight value for the H1 and the H2; (3) calculating a variable within a same range as the weight value; and (4) comparing the variable and the weight value to produce a result, such that if the result is false, H2 is selected as the selected pixel and such that if the result is true, H1 is selected as the selected pixel.

According to a preferred embodiment of the present invention, the step of calculating the variable is performed by obtaining the variable from a random number generator. Alternatively and preferably, the step of calculating the variable is performed according to the equivalent coordinate location of the pixel. Also alternatively and preferably, the step of calculating the variable is performed once per each continuous plurality of pixels in the UT images.

According to another preferred embodiment of the present invention, the step of calculating the weight value further comprises the steps of: (A) obtaining a value for a pixel from the equivalent coordinate location in the converted CT image, the value being designated as "CO"; (B) obtaining a value for a pixel from the equivalent coordinate location in the first CT image, the value being designated as "C1"; (C) obtaining a value for a pixel from the equivalent coordinate location in the second CT image, the value being designated as "C2"; (D) subtracting C1 from CO to form a first difference; (E) subtracting C1 from C2 to form a second difference; and (F) calculating a ratio of the first difference to the second difference, the ratio being the weight value.

According to yet another preferred embodiment of the present invention, the comparison process further comprises the steps of: (i) descreening the original HT image to produce a first CT (continuous tone) image; (ii) descreening the dilated HT image to produce a second CT image; (iii) performing a color conversion process on the first CT image according to the desired color conversion to produce a color converted CT image; (iv) dilating the first dilated HT image to produce a second dilated HT image; (v) descreening the second dilated HT image to produce a third CT image; (vi) comparing each pixel of the converted CT image, the second CT image, the third CT image and the first CT image to select a pixel from one of the second CT image, the third CT image and the first CT image; and (vii) merging each pixel of the original HT image, the second dilated HT image and the first dilated HT image according to the selected pixel to produce the color converted HT image.

Preferably, the step of comparing further comprises the steps of: (1) obtaining a first pixel from one of the original HT image, the second dilated HT image, the first eroded HT image and the first dilated HT image to a first output HT image according to the selected pixel; and (2) obtaining a second pixel from the original HT image, the second dilated HT image, the first eroded HT image and the first dilated HT image to a second output HT image according to the selected pixel.

According to still another embodiment of the present invention, the comparison process further comprises the steps of: (i) descreening the original HT image to produce a first CT (continuous tone) image; (ii) descreening the dilated HT image to produce a second CT image; (iii) performing a color conversion process on the first CT image according to the desired color conversion to produce a color converted CT image; (iv) dilating the first dilated HT image to produce a second dilated HT image; (v) descreening the second dilated HT image to produce a third CT image; (vi) eroding the original HT image to produce an eroded HT image; (vii) descreening the eroded HT image to produce a fourth CT image; (viii) comparing each pixel of the converted CT image, the second CT image, the third CT image, the fourth CT image and the first CT image to select a pixel from one of the second CT image, the third CT image, the fourth CT image and the first CT image; and (ix) merging each pixel of the original HT image, the second dilated HT image, the first eroded HT image and the first dilated HT image according to the selected pixel to produce the color converted HT image.

Preferably, the step of comparing further comprises the steps of: (1) obtaining a first pixel from one of the original HT image, the second dilated HT image, the first eroded HT image and the first dilated HT image to a first output HT image according to the selected pixel; and (2) obtaining a second pixel from the original HT image, the second dilated HT image, the first eroded HT image and the first dilated HT image to a second output HT image according to the selected pixel, such that two output HT images are produced.

More preferably, the step of merging further comprises the steps of:(3) calculating a weight value for the first pixel and the second pixel; (4) calculating a variable within a same range as the weight value; and (5) comparing the variable and the weight value to produce a result, such that if the result is false, the second pixel is selected as the selected pixel and such that if the result is true, the first pixel is selected as the selected pixel.

According to another embodiment of the present invention, there is provided an apparatus for color converting an original HT (halftone) image to a color converted HT image, comprising: (a) a relator for determining a relation between a density of the original HT image and a density of the color converted HT image; and (b) a dilator for dilating the original HT image according to a function of the relation to obtain the color converted HT image.

Preferably, the dilator further comprises: (i) a first dilating filter for dilating the original HT image to obtain a dilated HT image; (ii) a comparator for comparing a region of the original HT image and a region of the dilated HT image according to a comparison process, each of the regions corresponding to a pixel of the original HT image or of the dilated HT image; and (iii) a selector for selecting one of the pixel of the original HT image or the pixel of the dilated HT image to form a selected pixel, the selected pixel forming at least a portion of the color converted HT image.

More preferably, the comparator further comprises: (1) a first descreener for descreening the original HT image to produce a first CT (continuous tone) image; (2) a second descreener for descreening the dilated HT image to produce a second CT image; (3) a color converter for performing a color conversion process on the first CT image according to the desired color conversion to produce a color converted CT image; (4) a sub-comparator for comparing each pixel of the color converted CT image, the second CT image and the first CT image to select a CT image pixel from one of the second CT image and the first CT image; and (5) a merger for merging each pixel of the original HT image and the first dilated HT image according to the selected CT image pixel to produce the color converted HT image.

Most preferably, the sub-comparator further comprises: (A) an obtainer for obtaining a pixel from an equivalent coordinate location in the original HT image, the pixel being H1, and in the first dilated image, the pixel being H2; (B) a calculator for calculating a weight value for the H1 and the H2, and for calculating a variable within a same range as the weight value; and (C) a variable/weight value comparator for comparing the variable and the weight value to produce a result, such that if the result is false, H2 is selected as the selected pixel and such that if the result is true, H1 is selected as the selected pixel.

Also most preferably, the calculator further comprises: (I) a second obtainer for obtaining a value for a pixel from the equivalent coordinate location in the converted CT image, the value being designated as "C0"; (II) a third obtainer for obtaining a value for a pixel from the equivalent coordinate location in the first CT image, the value being designated as "C1"; (III) a fourth obtainer for obtaining a value for a pixel from the equivalent coordinate location in the second CT image, the value being designated as "C2"; (IV) a subtractor for subtracting C1 from C0 to form a first difference, and for subtracting C1 from C2 to form a second difference; and (V) a ratio calculator for calculating a ratio of the first difference to the second difference, the ratio being the weight value.

The following acronyms and terms are used in this document.

Continuous Tone (CT) is a method of coding images as arrays of words, in which each pixel is represented by a plurality of computer words or integer variables, each having more than two possible values, for example 256 values in an 8-bit word.

Half Tone (HT) is a method of coding images as arrays of bits, in which each pixel is represented by a plurality of bits or Boolean variables, each having only two possible values, for example: 0 or 1, true or false, black or white, light or dark.

Erosion is an operation on an HT image. It does not change the number of pixels in the image, and it does not change the number of separations in a pixel. It decreases the darkness of the image, by increasing the number of the pixels that are coded light. It never changes a light value to a dark one.

Dilation is an operation on an HT image. It does not change the number of pixels in the image, and it does not change the number of separation in a pixel. It increases the darkness of the image, by increasing the number of the pixels that are coded dark. It never changes a dark value to a light one.

Descreening (DS) is an operation receiving an HT image as input and producing a CT image as output. It does not change the number of separation in a pixel. It attempts to affect no change in the appearance of the image, so that when both HT and CT images are printed by some printing process, the resulting images would appear equivalent to a human observer. This is possible, provided that the observer will not pay any attention to image detail of relatively smaller dimensions.

Picture element is a discrete element of an image or a pixel. An image is represented by a two dimensional array of pixels. A pixel is represented by a plurality of computer words, one word per separation. A pixel represents a unit of the area on an image, usually a square or rectangular area.

BRIEF DESCRIPTION OF THE DRAWINGS

The foregoing and other objects, aspects and advantages will be better understood from the following detailed description of a preferred embodiment of the invention with reference to the drawings, wherein:

FIGS. 5A–5C are flowcharts showing an illustrative general conversion method of the present invention;

FIGS. 6A–6E are flowcharts showing an illustrative rapid conversion method of the present invention.

DESCRIPTION OF BACKGROUND ART

The following description is intended to provide a description of certain background methods and technologies which are optionally used in the method and system of the present invention. The present invention is specifically not drawn to these methods and technologies alone. Rather, they are used as tools to accomplish the goal of the present invention, which is an efficient method and system for the color conversion of HT images with minimal loss of HT-specific information.

Examples of such technology include dilation and erosion, two processes which are well known in the art (see for example R. Gonzalez and R. Woods, *Digital Image Processing*, Addison-Wesley Publishing Company, 1992, pp 518, 512, 550; R. Haralick and L. Shapiro, *Computer and Robot Vision*, Vol. 1, Chap. 5, Addison-Wesley Publishing Company, 1992; A. Jain, *Fundamentals of Digital Image Processing*, Prentice-Hall, 1986, p 384).

Briefly, the operation of dilation increases the size of clusters of pixels of similar color in HT images. This operation reduces the size of clusters of pixels of the opposite color, because the total number of pixels in the HT image does not change. Therefore the same operation is also described as erosion for the color of the clusters of pixels being reduced.

The operation of dilation on an image to be dilated can be more precisely described as follows. For the purposes of the following description, the dilation is assumed to be performed on clusters of black pixels. The operation requires a set of coordinate points known as a structuring element or kernel, which acts as a mask and determines how the operation of dilation is performed on the image. To compute the dilation of an HT image by this kernel, each pixel is input in turn. The kernel is superimposed on top of the input HT image so that the origin of the kernel coincides with the coordinates of the input pixel. If at least one pixel in the kernel coincides with a black pixel in the image underneath, then the input pixel is set to a black pixel. If all the corresponding pixels in the image are white, the input pixel is left as a white pixel. Thus, as described in this example, the operation of dilation on an HT image tends to enlarge regions of black pixels.

Similarly, for erosion, if for every pixel in the kernel, the corresponding pixel in the image underneath is a black pixel, then the input pixel is left as it is. If any of the corresponding pixels in the image are white pixels, the input pixel is also changed to a white pixel. Thus, the operation of erosion on an HT image tends to reduce regions of black pixels.

Examples for the operation of dilation and erosion are given in FIG. 1–3. In these examples dilation and erosion are defined from the point of view of the black color, in which black is assumed to be coded as 1 and white as 0.

Figure 1A:
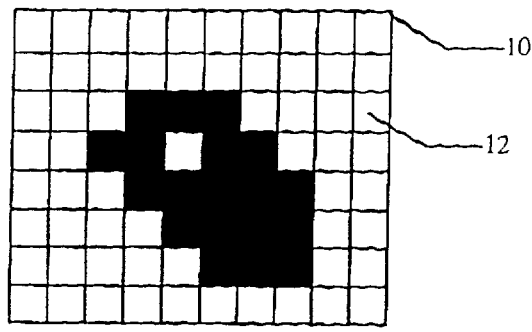
FIGS. 1A and 1B are schematic representations of an HT coded image.

FIG. 1A is a schematic representation of an exemplary region 10 of an HT image. As shown, region 10 is a two-dimensional array of pixels 12. In this example, the HT image contains only one separation, so each pixel 12 consists of only one Boolean variable, such that the two possible values for each pixel 12 are shown as white or black. Region 10 contains 8 rows of 10 pixels 12 each, of which 19 pixels 12 are black.

Figure 1B:
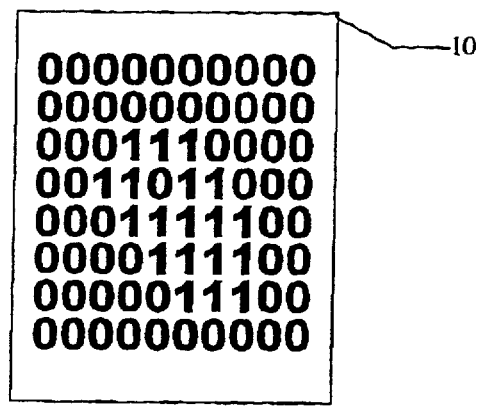

FIG. 1B shows region 10 of FIG. 1A, but with white represented as the number "0" and black represented as the number "1". The opposite representation, in which white is "1" and black is "0", is also possible.

Figure 2A:
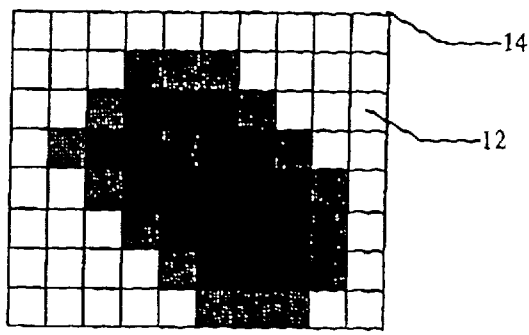
FIGS. 2A and 2B show the effects of a dilation operation on FIG. 1.
Figure 2B:
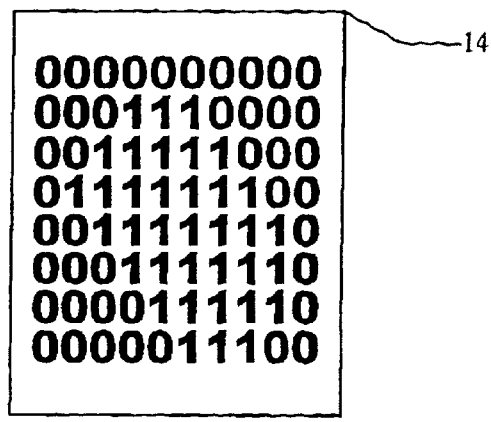

FIG. 2A is a schematic representation of the effect of a dilation operation on region 10 of FIG. 1A to produce a dilated region 14. Dilated region 14 contains the same number of pixels 12 as region 10 of FIG. 1A. However, 17 pixels 12 which were white in FIG. 1A are black in FIG. 2A. No pixels 12 which were black in FIG. 1A have been changed to white. FIG. 2B shows dilated region 14 of FIG. 2A, but again with white represented as the number "0" and black represented as the number "1".

Figure 3A:
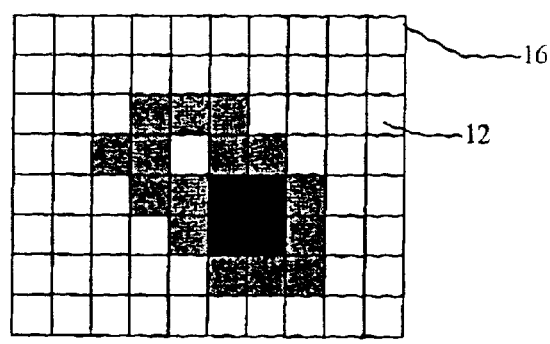
FIGS. 3A and 3B show the effects of an erosion operation on FIG. 1.
Figure 3B:
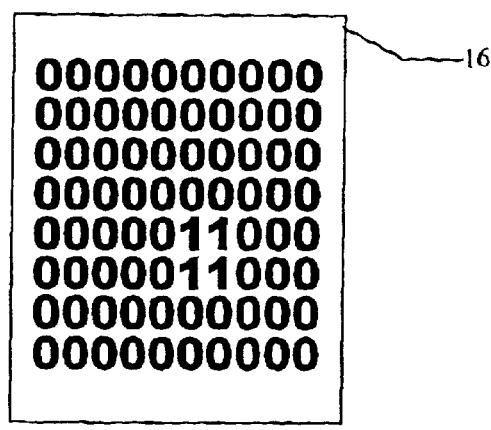

FIG. 3A is a schematic representation of the effect of an erosion operation on region 10 of FIG. 1A to produce an eroded region 16. Eroded region 16 contains the same number of pixels 12 as region 10 of FIG. 1A. However, all but 4 pixels 12 which were black in FIG. 1A have been changed to white. No pixels 12 which were white in FIG. 1A have been changed to black. FIG. 3B shows eroded region 16 of FIG. 3A, but again with white represented as the number "0" and black represented as the number "1".

Defined as above, dilation causes an image to appear darker, and erosion causes an image to appear lighter. As known in the art, dilation and erosion increase or decrease clusters by exactly one layer of pixels. So, if a cluster is round, dilation increases its radius by one pixel exactly. Therefore, a significant drawback of these operations is that they produce a constant amount of color change.

One example of the application of the processes of dilation and erosion to HT images is disclosed in U.S. Pat. No. 5,258,854. This application attempts to pre-emptively compensate for artifacts resulting from the process of printing such HT images. HT or bitmap images are typically printed by using a laser to lo dissipate a uniformly deposited charge on an exposed photoconductive surface according to the light and dark areas of the bitmap. One type of such a system is the "write-white" system, in which the laser dissipates the charge on the surface according to the light areas of the bitmap, in which printing is not desired. Conversely, the "write-black" system uses the laser to dissipate charge according to the dark areas of the bitmap, in which printing is desired. Each system has its own set of artifacts. Write-white systems tend to erode black lines, while write-black systems tend to dilate black lines.

The method disclosed in U.S. Pat. No. 5,258,854 attempts to compensate for these artifacts by performing the processes of erosion or dilation on selected portions of the image, depending upon the printing system being used, in order to enable the printed image to remain true to the digitally coded electronic image despite these artifacts. The disclosed method requires the alteration of the resolution of the image. U.S. Pat. No. 5,483,351 also discloses a method of compensation for write-white printer artifacts by using dilation but without resolution compensation. Both U.S. Pat. Nos. 5,483,351 and 5,258,854 disclose methods which perform halfbitting erosion and dilation operations. The term "halfbitting" refers to a change which statistically changes "half" a pixel on a per pixel basis, such that the density of the resultant image is exactly halfway between the density of the original image and the density of the eroded or dilated image. Thus, the exact magnitude of the required change does not need to be calculated.

If the exact magnitude of the required change must be controlled, a descreening operator must be used. Such an operator is not taught or suggested by U.S. Pat. Nos.

5,483,351 and 5,258,854, since it is not necessary for "halfbitting" procedures. Furthermore, the methods disclosed in U.S. Pat. Nos. 5,483,351 and 5,258,854 are particularly drawn towards the detection of the edges of features in an image, of a type known as large coherent objects. Thus, these disclosed methods are relatively sophisticated for feature detection, but relatively less sophisticated for color conversion.

U.S. Pat. No. 5,680,485 discloses a method for mapping digital image data by using a pair of erosion-based filters. One filter of the pair creates a superset of the image, while the other filter creates a subset of the image, thereby effectively both eroding and dilating the image. However, the method is only disclosed as useful for converting the resolution of the image, rather than the color. Furthermore, the process of descreening is not taught or suggested as a component of the disclosed method, since the disclosed method is not directed toward the color conversion of halftone images. Thus, the disclosed method does not teach or suggest the color conversion of halftone images.

In addition, U.S. Pat. No. 5,680,485 discloses a pair of erosion or dilation-based filters for mapping digital image data. A combinatorial logic operation is then applied to the two eroded or dilated images and the original image to produce an output image. However, the disclosed method can only be performed according to the fixed logic, such that flexibility of operation is reduced. Furthermore, a descreening operation is not used to effect the color conversion.

DESCRIPTION OF THE PREFERRED EMBODIMENTS

The present invention is of a method and a system for color conversion of an HT image. According to the method of the present invention, an original HT (halftone) image is color converted to form a color converted HT image by dilating the original HT image according to a function of a relation between a density of the original HT image and a density of the color converted HT image to obtain the color converted HT image. Since dilation and erosion are mirror processes, such that any process of erosion can also be described as a process of dilation, the term "dilation" is used to encompass both processes of dilation and processes of erosion, unless otherwise indicated in the text.

More specifically, the original HT image is eroded or dilated to produce two similar images to the original image. These similar images are then interpolated to produce the image of the desired density. The process of interpolation enables the original HT image to be dilated according to the function of the relation between the density of the original HT image and the density of the color converted HT image to obtain the color converted HT image. Thus, the processes of erosion and dilation, coupled with interpolation of the eroded and dilated images, enable the process of color conversion of the HT image to retain important HT features.

In this respect, dilation and erosion are color operations on HT images. They are better than a combination of DS and screening, because they cause only the minimum of distortion of the shape of pixel clusters, and no change in the distances between clusters.

This description of the present invention does not address the issue of compression, or any other coding method. For the purposes of discussion only, the following description assumes that the image has been de-compressed or otherwise converted to being represented as a two dimensional array of pixels. Although HT images are generally two-dimensional images represented as two-dimensional arrays of pixels and are described below as such, the present invention could easily be extended to images of three or more dimensions. The following description also assumes that the value "0" corresponds to white, and the value "1" corresponds to black, it being understood that the converse could also be employed with the method and system of the present invention.

The principles and operation of a method for color conversion of an HT image according to the present invention may be better understood with reference to the drawings and the accompanying description, it being understood that these drawings are given for illustrative purposes only and are not meant to be limiting.

Figure 4A:
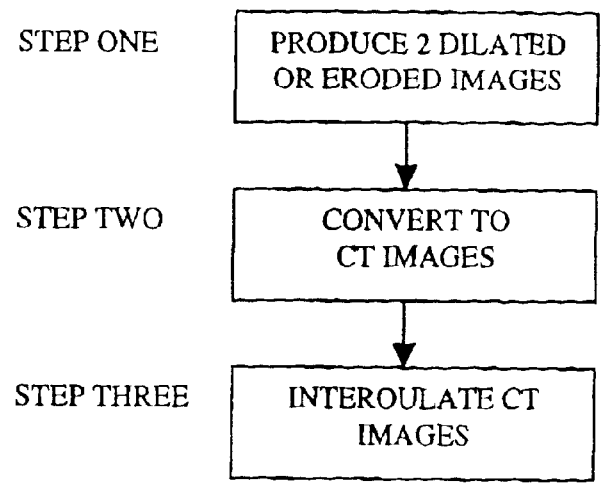
FIGS. 4A and 4B are flowcharts showing illustrative methods of the present invention.

Referring now to the drawings, FIG. 4A shows a flow chart of an exemplary method for color conversion of an HT image according to the present invention.

The exemplary method of FIG. 4A can be briefly described as follows. It is well known in the art that the operations of dilation and erosion can be repeatedly applied on an HT image. In this way, a plurality of images can be derived from the original image, ranging from an all white image to an all black image, or in other terms, from an all "0" image to an all "1" image. Therefore, for each and every region of an HT image, the following is usually true.

The original density is defined as the ratio of black pixels in the region to the total number of pixels in the region, and thus ranges from 0 to 1. The desired density is the result of applying a given color conversion process to the original density. Dilated density 'I' is the density of the original image dilated 'I' times. Eroded density 'J' is the density of the original image eroded 'J' times. There exists either an integer 'I' for which dilated density 'I' is less or equal to the desired density, and dilated density 'I'+1 is greater or equal to the desired density, or an integer 'J' for which eroded density 'J'+1 is less or equal to the desired density, and eroded density 'J' is greater or equal to the desired density.

The two images, either produced with dilated densities 'I' and 'I'+1, or with eroded densities 'J+1' and 'J', are defined as the two similar images for the given original image region. Thus, the original image is eroded and dilated, and the two similar eroded or dilated images are found for each region as defined above.

However, this process is not suitable for changing the color of image regions which are either all "0" or all "1". If such a color conversion is required, which is not always the case, a further step of seeding all "0" regions with one or more 1's, or seeding all "1" images with one or more 0's is required.

The steps of the method are as follows. First, as shown in step one, at least one dilated or eroded image is produced. The choice of dilation or erosion is made according to the desired effect of the color conversion of the original HT image. Next, as shown in step two, the dilated or eroded image, as well as the original HT image are converted to CT images. The CT image obtained from the original HT image is color corrected according to some specified color correction producing a CT image of the desired density.

In step three, the at least two HT images, the original image and the at least one eroded or dilated image, are interpolated to produce the HT image with the desired color conversion. The process of interpolation involves the comparison of each pixel of the two HT images. For every pixel location, if the pixel is black in both images, it is black in the result. If the pixel is white in both images, it is white in the result. Otherwise, the pixel may be either black or white. In the last situation, a decision must be made as to the color of the pixel, such that the pixel is taken from one of the HT images and not from the other.

The at least three CT images produced by the process of descreening, as shown in more detail in FIG. 4B below, are then compared. For every pixel location of the CT images, the value of that pixel for the CT image converted from the original HT image is compared to the value of the equivalent pixels for the color converted CT image and the CT image or images produced from the at least one eroded or dilated HT image. The closer the pixel value from the desired color converted CT image is to the value of one of the other images, the more likely it is that the selected HT pixel will be selected from the corresponding HT image. Thus, the comparison of the CT images is used for the process of interpolation of the HT image or images obtained by erosion or dilation with the original HT image.

Figure 4B:
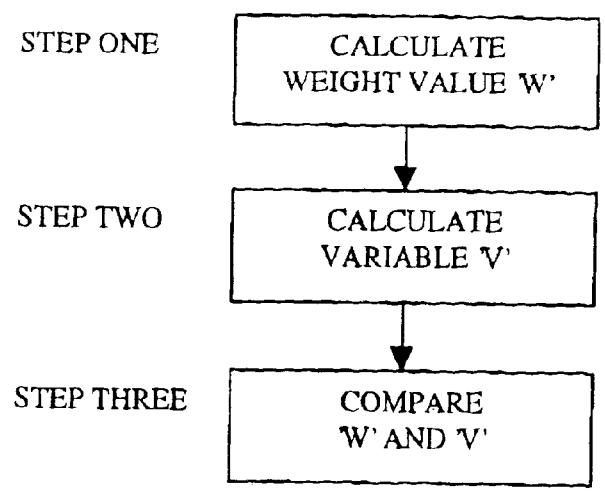

As shown in FIG. 4B, the process of comparison of the CT images, in order to determine the similar image from which a pixel is selected, is performed as follows. The first step calculates the relative position of the desired CT value between the CT values of the similar images, according to Equation 4, in which 'W' is the weight value, C0 is the desired CT value, and C1 and C2 are the CT values of the two similar images.

$$W=(C0-C1)/(C2-C1) \qquad \text{Equation 4:}$$

This equation calculates a weight value 'W' which is normalized according to a first preferred implementation to the range between 0 and 1.

According to a second preferred implementation, 'W' is an integer value, for example in the range between 0 and 2 to the power of 15 or 16.

In the second step, a variable 'V' is calculated per pixel. Preferably, 'V' is obtained from a random number generator. Alternatively and preferably, 'V' is calculated from the location of the pixel within its image, for example, the location of the pixel taken from the original input image. In this second case, periodic functions such as sine or cosine may be used.

For example, if the two dimensional location of a pixel is given by 'X' and 'Y', then Equation 5 may be used, where 'A', 'B', 'C', 'D', 'E' and 'F' are constants.

$$V=C+D\ Sin(AX+E)*Cos(BY+F) \qquad \text{Equation 5:}$$

According to one possible implementation, 'V' is calculated for every pixel location in the HT image. Even though HT images are defined as consisting of one bit pixels, their bits are usually packed into computer words of fixed size, for example 8 bits per byte. Unpacking the bytes to obtain individual bits is generally relatively trivial and is not described here. However, according to a preferred implementation of the method of the present invention, 'V' is calculated at the moment of obtaining one byte that is to be divided into 8 bits. Thus, 'V' is preferably calculated only once per 8 bits.

The calculation of 'V' only once per 8 bits yields two benefits. One benefit is to increase calculation speed. The other benefit is to reduce noise in the resulting HT image and to obtain a more pleasing shape of any resulting clusters of similarly colored pixels. Furthermore, as the variation of the value for 'V' is increased, the precision of control over the process of color conversion is increased. This approach contrasts sharply with prior art methods, such as the method disclosed in U.S. Pat. Nos. 5,680,485, 5,483,351 and 5,258,854, which are performed with combinatorial logic.

In the third and last step towards HT interpolation, the variables 'V' and 'W' calculated as described above are compared to each other. An HT pixel is selected from one of the two similar images based upon this comparison.

Figure 5A:
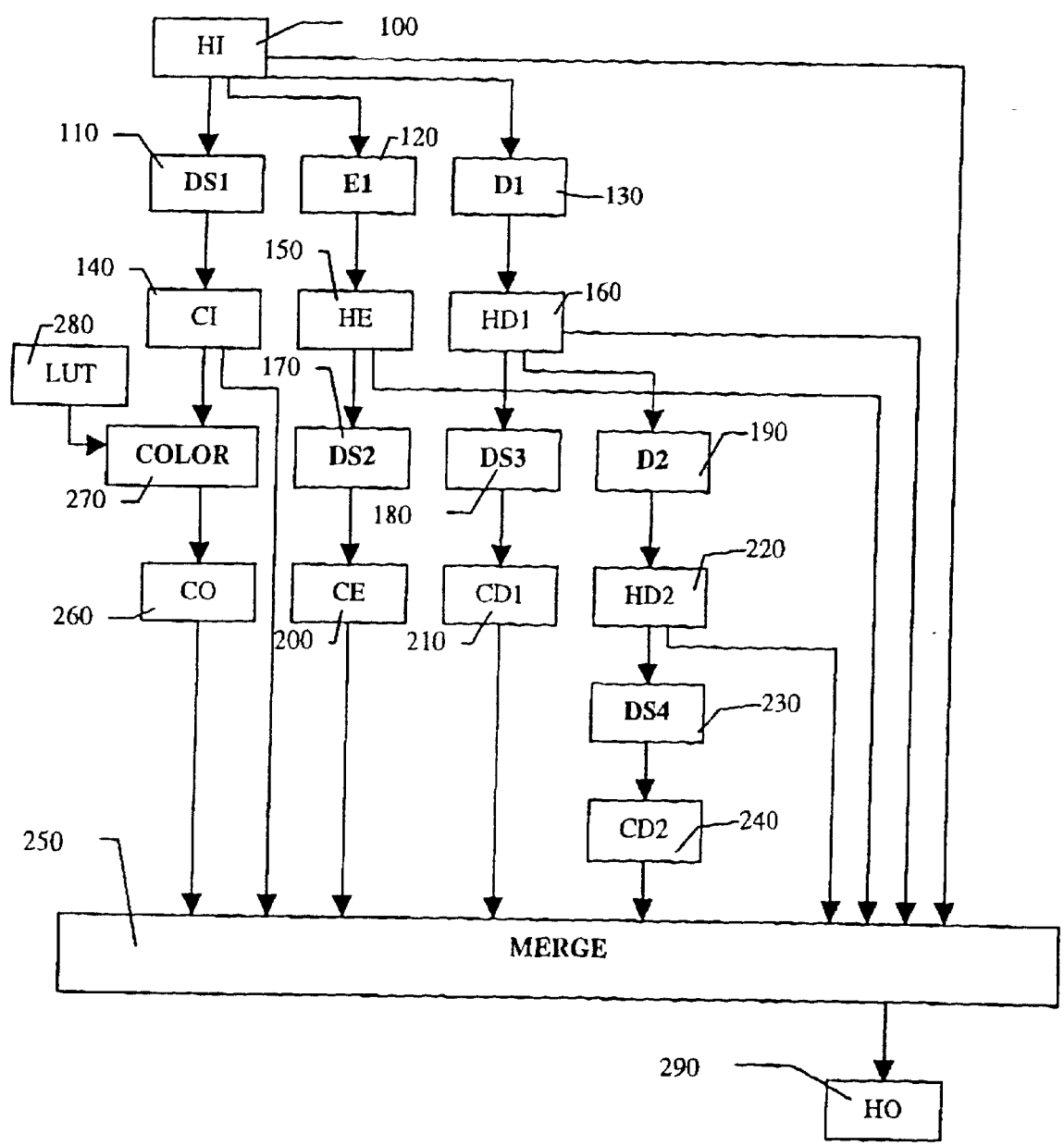

FIG. 5A shows a block diagram of one exemplary implementation of the method of the present invention. Block 100 is an input HT image and block 290 is the output HT image after color conversion. The original input HT image (block 100) is eroded and dilated in parallel to produce eroded and dilated images. A series of descreening operations is used to convert both the original input HT image (block 100) and the eroded and dilated versions of the original input HT image as follows.

In block 110, a first descreening operation converts the input HT image to a first CT image, shown as block 140. In block 120, an erosion operation erodes the input HT image of block 100 to produce an eroded HT image, shown as block 150. A first dilation operation, shown in block 130, produces a first dilated HT image (block 160). A second dilation operation (block 190) receives first dilated HT image (block 160), and produces a second dilated UT image (block 220).

A second descreening operation (block 170) changes the eroded HT image (block 150) to a second CT image (block 200). A third descreening operation (block 180) changes the first dilated HT image (block 160) to a third CT image (block 210). A fourth descreening operation (block 230) changes the second dilated HT image (block 220) to a fourth CT image (block 240).

An additional input (block 280) specifies the desired color conversion for converting the color of the original HT image (block 100). A color conversion operation (shown as block 270) is then performed on first CT image (block 140) to produce yet another converted CT image (block 260). An image merging operation (block 250) merges HT images of blocks 150, 100, 220 and 160 with reference to CT images of blocks 140, 200, 210, 240 and 260 to produce the output HT image (block 290).

Figure 5B:
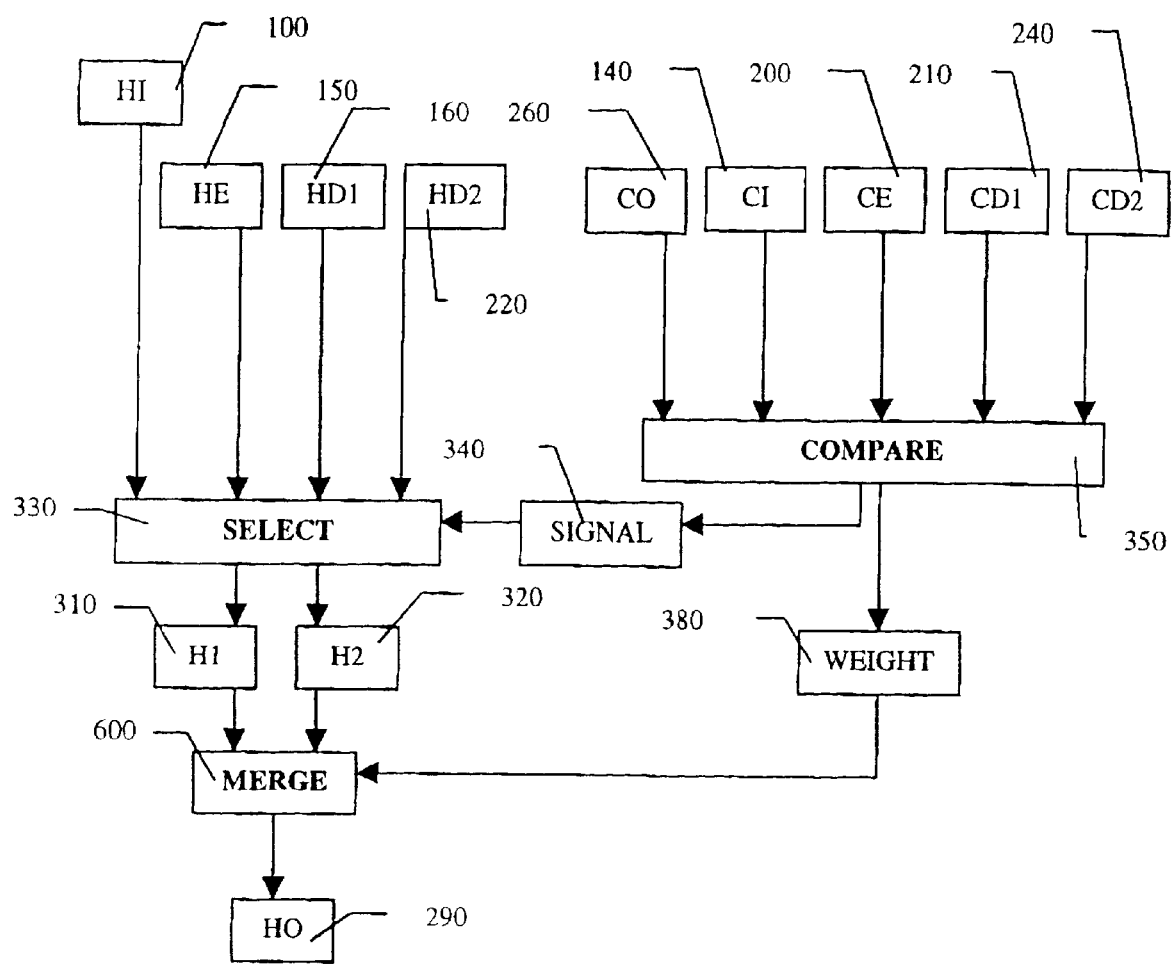

FIG. 5B provides a more detailed explanation of the merging operation (block 250) of FIG. 5A above. This merging operation takes one eroded and two dilated HT images as input, in addition to the original input HT image and the five CT images produced from these HT images. Part of merging operation (block 250) employs the simpler merging operation (block 600) as shown in FIGS. 6A–6D below. Briefly, two inputs to simpler merging operation (block 600) are HT images 310 and 320 (designated as H1 and H2, respectively). These two HT images 310 and 320 are selected from all input HT images by a selector 10 330. The selection is done according to signal information (block 340) supplied by an HT image comparing unit (block 350).

For example, this signal can be coded using integer words of at least two bits, and selector 330 can obey the following rules for each pixel location.

If the signal word equals 0, then select the pixel from HE (block 150) and transfer it (or copy it) to H1 (block 310), and also select the pixel from HI (block 100) and transfer it to H2 (block 320).

Otherwise, if the signal word equals 1, then select the pixel from HI (block 100) and transfer it to H1 (block 310), and also select the pixel from HD1 (block 160) and transfer it to H2 (block 320).

Otherwise select the pixel from HD1 (block 160) and transfer it to H1 (block 310), and also select the pixel from HD2 (block 220) and transfer it to H2 (block 320).

Comparing unit (block 350) compares four input CT images against a fifth CT image, as shown in more detail in FIG. 5C. Comparing unit 350 also produces weight information (block 380) which is used by simpler merging operation 600 in producing the output HT image 290.

The operation of the comparing unit (block 350) is shown in more detail as a flowchart in FIG. 5C. This flowchart explains the comparing operation 350 in FIG. 5B.

This operation receives five CT images, and produces weight information 380 and signal information 340. The process described in this flowchart is iterated for every pixel in the HT images, all of which contain the same number of pixels.

In the first step (block 400), one pixel is obtained from the equivalent location of every CT image. Each pixel is designated by the following symbols. CI: a pixel from the CT image producing by descreening of the original HT image. CO: a pixel obtained from the color conversion CT image which was produced as the result of performing the color conversion (block 280) on the CT image containing pixel CI. CE: a pixel from the CT image produced by descreening the eroded HT image. CD1: a pixel from the CT image produced by descreening the first dilated HT image. CD2: a pixel from the CT image produced by descreening the second dilated HT image. 20 Block 400: There are 5 CT files which are two dimensional arrays of pixel. Each pixel can be indexed by two integers, designated as X and Y. X can be iterated from the value from "1" to the Image Width, and Y can be iterated from "1" to the Image Height. At each iteration, a pixel is selected according to the current values of X and Y, one pixel from each image. For the purposes of discussion only and without wishing to be limited in any way, each pixel is assumed to be one word, such that each image is a one-separation image, although of course the method could easily be extended to images of more than one separation.

Block 410: There are now 5 words, one for each pixel from each image, which are actually 5 integer numbers. These numbers are compared, for example to determine if CO<CI.

Block 420: If this comparison is correct, a signal is now sent to the selector to select the pixel from the eroded HT image and the pixel from the original input HT image. In the example hereinabove, the word in the signal information which corresponds to the current pixel location has a value of 0.

Block 430: In this block, the comparison of CI<CO<CD1 is examined to determine if it is correct.

Block 440: If so, a signal is sent to the selector to select the original input HT image and the first dilated HT image. In this example, the word in the signal information which corresponds to the current pixel location has a value of 1.

Block 450: If neither comparison is true, the default response is to send a signal to the selector to select the first dilated HT image and the second dilated HT image such that the value of the word in the signal information which corresponds to the current pixel location has a value of 2.

Block 460: Now two words have been selected, designated as C1 and C2.

Block 470: The words of the color converted CT image and the two selected CT image are numbers, enabling the following formula to be calculated: (CO−C1)/(C2−C1). The formula must be calculated using non-integer arithmetics, such as floating point or fixed point arithmetics so that the result is a value ranging from 0 to 1, and is therefore not an integer. This value may be scaled by any factor or otherwise coded as an integer, if desired. This value is 'W', the weight. If the value is not between 0 and 1, inclusive, then it is adjusted to the nearest end of the range. For example, if it is greater than one, the value is adjusted to be one.

This process is repeated until all of the image has been scanned. The method of scanning itself is not important, and can be line by line, row by row, or whatever is desired.

In the more general case, of a multi-separation image, there needs to be an iteration over the separation. The most efficient implementation depends upon the details of the coding of the image. For example, one implementation iterates the whole algorithm, as depicted in FIG. 4A, for each separation, and solves the problem separation by separation.

The method of FIGS. 5A–5C requires many steps of dilation and erosion of original image of block 100, with the resultant creation of many images in varying stages of dilation and/or erosion. Such a method is a broadly applicable method of color conversion, but may be either too slow or too expensive for a sufficiently commercial application with currently available technology.

Often, the desired color conversion is limited in extent in the sense that the converted image and the original are similar. For example, sometimes converted image pixels are never darker than original image pixels at the same location, and sometimes they are never lighter. In such cases, there is no need to calculate all erosions and all dilations of the original image. In an extreme case, only one dilation or one erosion is required. Thus, a number of preferred embodiments of the present invention are possible, some of which are better suited to limited color conversion, and some of which are better suited to a more general procedure for color conversion.

Figure 6A:
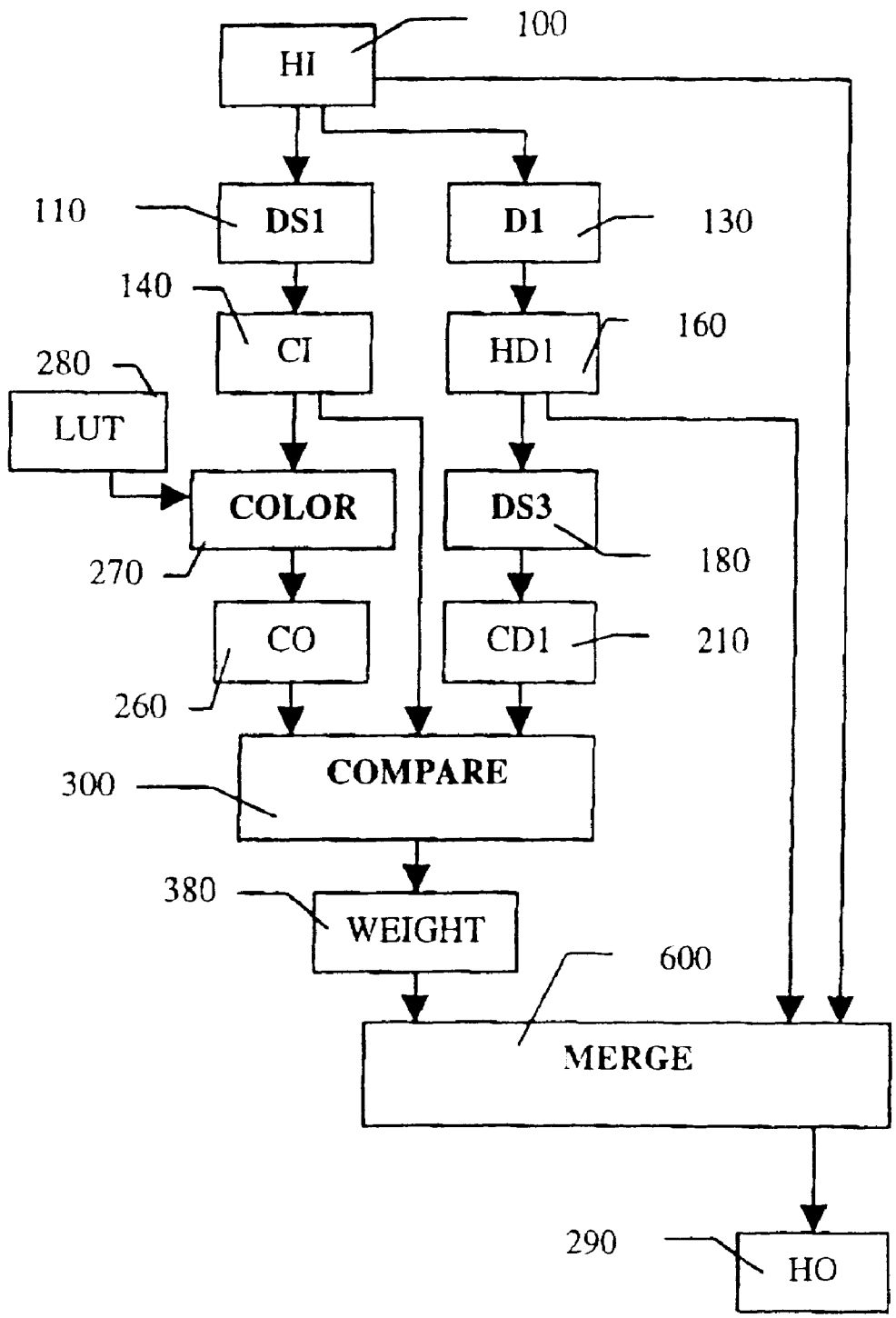

For example, the narrowest but fastest implementation of the method of the present invention involves only one dilation or erosion operation, as shown in FIG. 6A. FIG. 6A is a block diagram explaining a second preferred method for color conversion of an half tone image. This method employs only one dilation operation, so this method is faster in execution relative to the first method depicted in FIG. 5A. However, the method of FIG. 6A is less broadly applicable and can only produce a more limited set of color conversions.

As shown in FIG. 6A and as for FIG. 5A, block 100 is an input HT image and block 290 is the output HT image after color conversion. The original input HT image (block 100) is then dilated to produce one dilated image. A series of descreening operations is used to convert both the original input HT image (block 100) and the dilated version of the original input HT image as follows.

As for FIG. 5A, in block 110, a first descreening operation converts the input HT image to a first CT image, shown as block 140. A first dilation operation, shown in block 130, produces a first dilated HT image (block 160). A second descreening operation (block 180) changes the first dilated HT image (block 160) to a second CT image (block 210).

An additional input (block 280) specifies the desired color conversion for converting the color of the original HT image (block 100). A color conversion operation (shown as block 270) is then performed on first CT image (block 140) to produce yet another converted CT image (block 260). A comparator (block 300) compares the three CT images of blocks 140, 210 and 260, producing weight information 380. The comparator (block 300) is shown in more detail in FIG. 6E below. An image merging operation (block 600) then merges the two HT images to produce the output HT image (block 290).

Figure 6B:
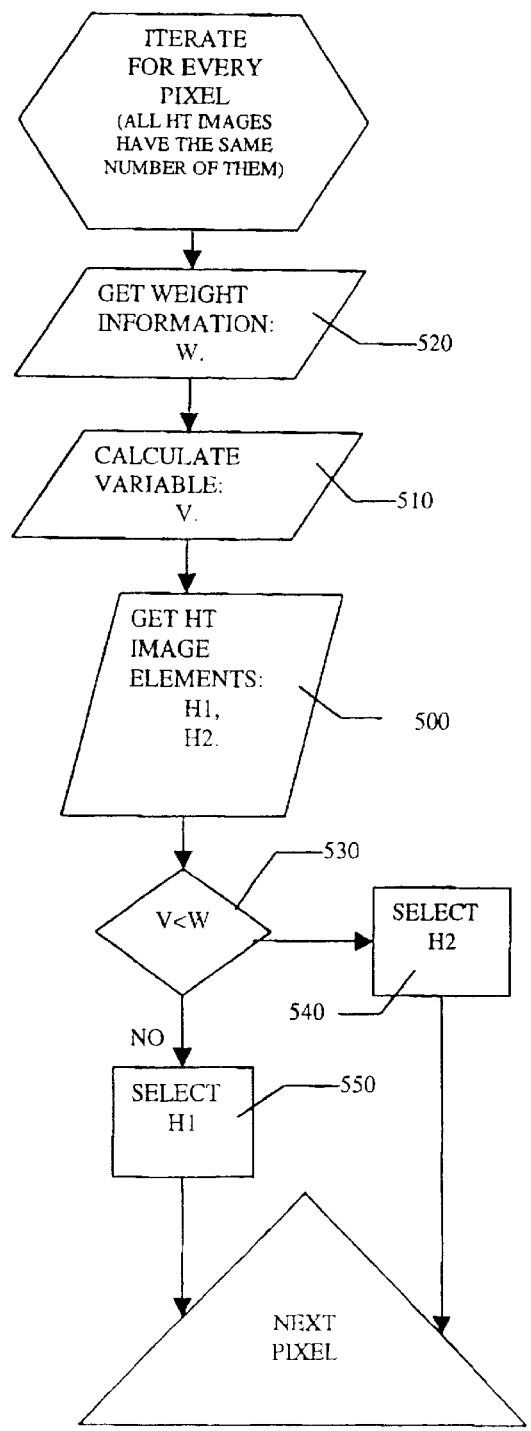

FIGS. 6B–E describe image merging operation (block 600) in more detail. FIG. 6B is a flowchart showing the steps involved in the merging operation (block 600). Merging operation (block 600) receives two HT images as input, and produces one HT image as output. The process described in this flowchart is iterated for every pixel in the input HT images, which all contain the same number of pixels.

In block 500, one pixel is obtained from the equivalent coordinate location in each of the two input HT images. These pixels are designated as "H1" and "H2".

In block 520, a weight value 'W' is obtained from the procedure described in more detail with regard to block 380 for FIG. 6A. The weight value 'W' may vary from pixel to pixel.

According to a first preferred embodiment of this method, the weight value 'W' is in a range from 0 to 1. The weight value 'W' is 0 if H1 is to be selected, 1 if H2 is to be selected, and 0.5 if both H1 and H2 may be selected in equal probability, such that the weight value 'W' represents the probability that H2 is selected.

In block 510, a variable 'V' is calculated per pixel. 'V' must be in the same range as 'W'. According to the previously described preferred embodiment of the weight value, 'V' is also in the range from 0 to 1. Preferably, 'V' is obtained from a random number generator. Alternatively and preferably, 'V' is calculated from the location of the pixel within the image, for example, the location of the pixel taken from image H1 in block 500. For this alternative and preferred embodiment, periodic functions such as sine or cosine may be used to calculate 'V'.

In block 530, 'V' is compared with 'W'. The result of this comparison is either true or false, which determines the next step. If 'V' is greater than 'W', H1 is selected to be the element of the resulting HT image in block 550. otherwise, H2 is selected to be the element of the resulting HT image in block 540.

FIGS. 6C and 6D show the results of the merging operation of FIG. 6B. Briefly, in this example, the two input HT images are those of FIGS. 1 and 3. The result of the merging operation is an average of the two input HT images in terms of color or density. The image of FIG. 1 contains 19 black pixels and the image of FIG. 3 contains only 4, so the resultant merged image shown in FIG. 6C contains (19+4)/2=11 black pixels. No fractions of a pixel are possible. The gray boxes of FIG. 6C indicate the pixels which were black in FIG. 1A but which are white in FIG. 6C as a result of the merge with FIG. 3A. FIG. 6D shows the same image as in FIG. 6C, but with "1" and "0" standing for black and white, respectively. A comparison with FIG. 1B shows that some of the "1" pixels have been changed to "0".

FIG. 6E shows comparator (block 300) of FIG. 6A in more detail. Comparator (block 300) receives three CT images, and produces weight information 380, but does not produce signal information 340. The process described in this flowchart is iterated for every pixel in the CT images, all of which contain the same number of pixels.

In block 480, one pixel is obtained from an equivalent location in every CT image. These pixels are designated as follows. C1: a pixel from the original HT image after the process of descreening has been performed. CO: a pixel obtained from the color conversion CT image which was produced as the result of performing the color conversion (block 280) on the CT image containing pixel C1. C2: a pixel from the CT image produced by descreening the first dilated HT image. In block 470, the following ratio is calculated: (CO−C1)/(C2−C1). This ratio is the weight information of block 380.

Figure 7A:
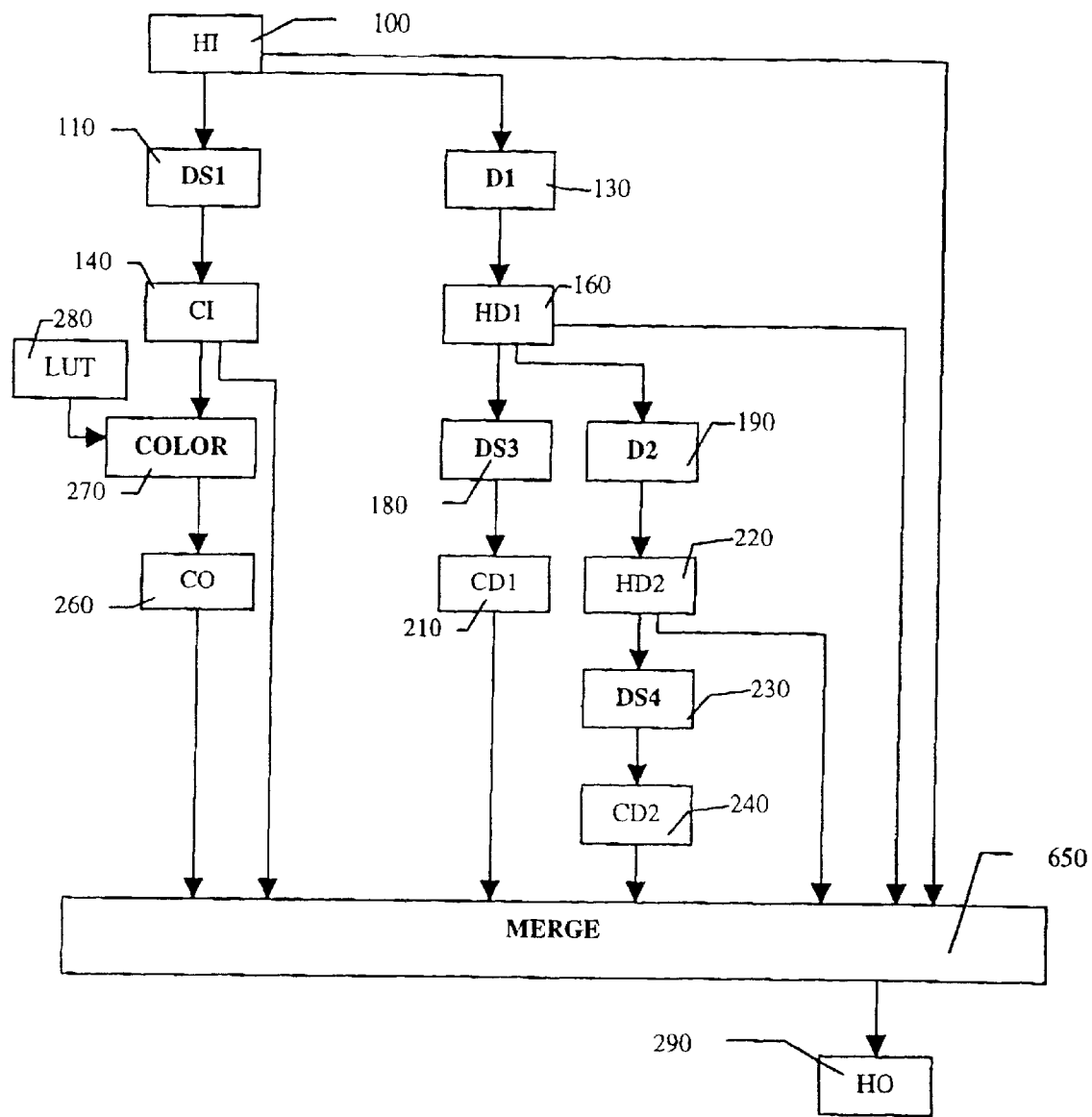
FIGS. 7A–7C are flowcharts showing an illustrative intermediate conversion method of the present invention.

FIG. 7A shows an implementation of the method of the present invention with intermediate properties which involves two dilation or erosion operations. This method is quite similar to that of FIG. 5A with the following exceptions. First, in this exemplary embodiment of the method, only two dilation operations and no erosion operations are used. Of course, the method could also be implemented with two erosion operations. Second, a different merging operation (shown as block 650) is used, as described in more detail for FIG. 7B.

As for FIG. 5A, block 100 is an input HT image and block 290 is the output HT image after color conversion. The original input HT image (block 100) is then eroded or dilated to produce eroded or dilated images. A series of descreening operations is used to convert both the original input HT image (block 100) and the eroded or dilated versions of the original input HT image as follows.

In block 110, a first descreening operation converts the input HT image to a first CT image, shown as block 140. A first dilation operation, shown in block 130, produces a first dilated HT image (block 160). A second dilation operation (block 190) receives first dilated HT image (block 160), and produces a second dilated HT image (block 220).

A third descreening operation (actually the second descreening operation for this implementation, since the second descreening operation of FIG. 5A has been removed) (block 180) changes the first dilated HT image (block 160) to a third CT image (block 210). A fourth descreening operation (block 230) changes the second dilated HT image (block 220) to a fourth CT image (block 240).

An additional input (block 280) specifies the desired color conversion for converting the color of the original HT image (block 100). A color conversion operation (shown as block 270) is then performed on first CT image (block 140) to produce yet another converted CT image (block 260). An image merging operation (block 650) merges the byproduct images of blocks 140, 210, 240 and 260 to produce the output HT image (block 290).

Figure 7B:
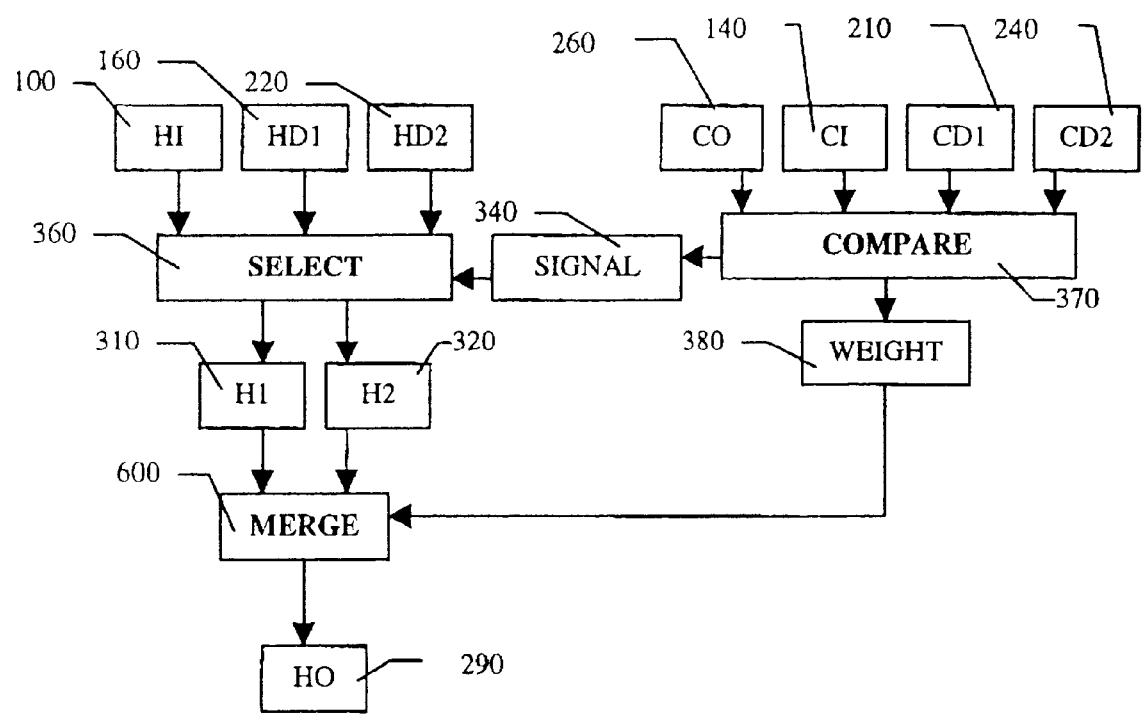

As shown in FIG. 7B, merging operation 650 has the following steps.

The inputs are 3 HT images, and also the output, as described in reference to FIG. 5B. They are fed to a selector unit 360 similar to that described in reference to FIG. 5B, but obeying a simpler set of rules as follows.

For example, signal information (block 340) can be coded using integer words of at least one bit, and selector 360 can obey the following rule for each pixel location.

If the signal word equals 0, then the pixel is selected from HI (block 100) and transferred to H1 (block 310), and also the pixel is selected from HD1 (block 100) and transferred to H2 (block 320).

Otherwise select the pixel from HD1 (block 160) and transfer it to H1 (block 310), and also select the pixel from HD2 (block 220) and transfer it to H2 (block 320).

These H1 and H2 are inputs to merge (block 600) described in reference to FIG. 6B.

The CT input images are as described in reference to FIG. 5B, and they are fed to comparator (block 370) described below in reference to FIG. 7C.

Figure 7C:
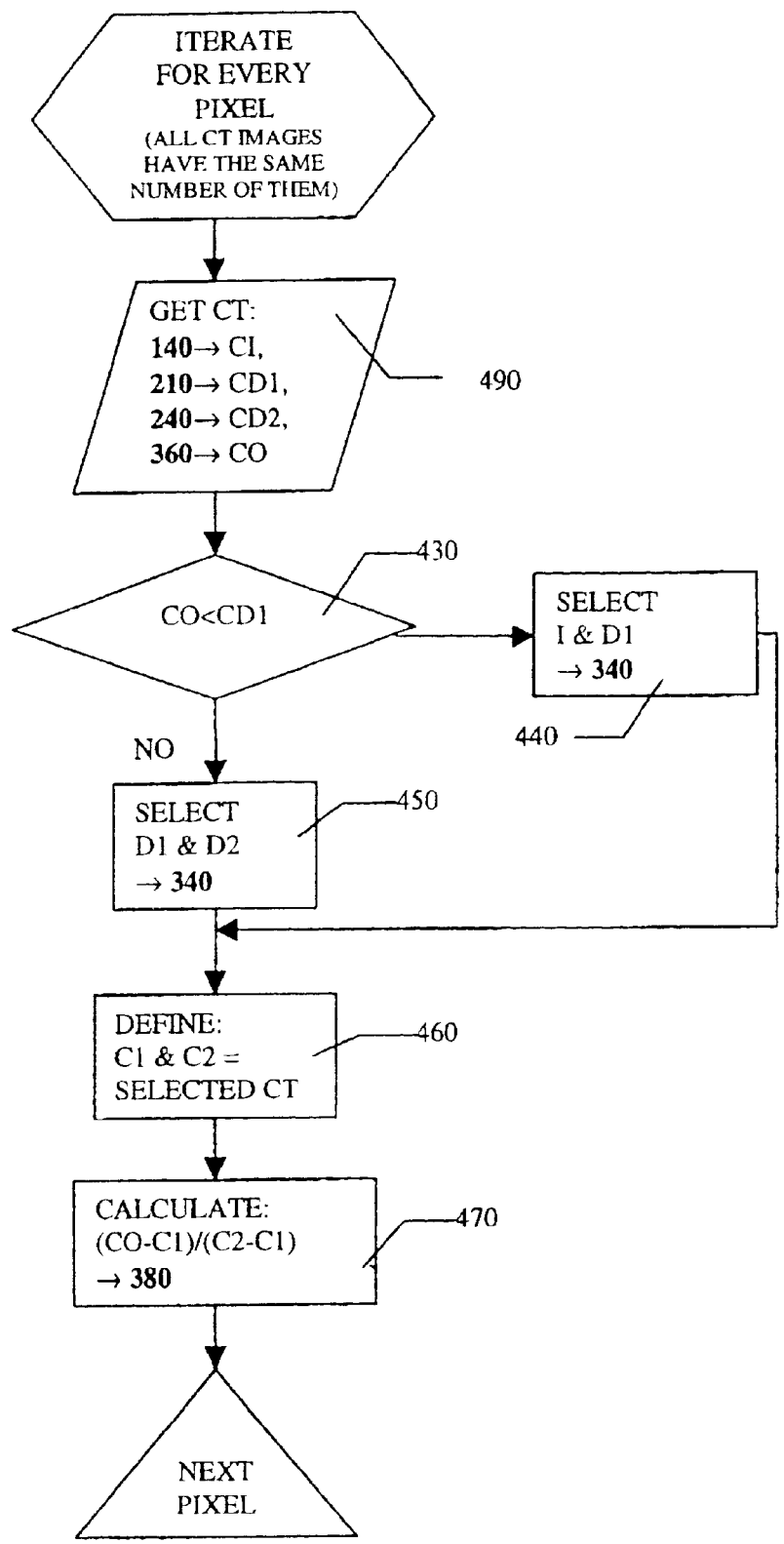

FIG. 7C shows the comparator (block 370) of FIG. 7B in more detail. This operation receives four CT images, and produces weight information 380 and signal information 340. The process described in this flowchart is iterated for every pixel in the HT images, all of which contain the same number of pixels.

In the first step (block 490), one pixel is obtained from the equivalent location of every CT image. Each pixel is designated by the following symbols. C1: a pixel from the CT image producing by descreening of the original HT image. CO: a pixel obtained from the color conversion CT image which was produced as the result of performing the color conversion (block 280) on the CT image containing pixel CI. CE: a pixel from the CT image produced by descreening the eroded HT image. CD1: a pixel from the CT image produced by descreening the first dilated HT image. CD2: a pixel from the CT image produced by descreening the second dilated HT image.

As for FIG. 5C above, there are 4 CT files which are 4 two dimensional arrays of pixel. Each pixel can be indexed by two integers, designated as X and Y. X can be iterated from the value from " 1" to the Image Width, and Y can be iterated from "1" to the Image Height. At each iteration, a pixel is selected according to the current values of X and Y, one pixel from each image. For the purposes of discussion only and without wishing to be limited in any way, each pixel is assumed to be one word, such that each image is a one-separation image, although of course the method could easily be extended to images of more than one separation.

Block 430: There are now 4 words, one for each pixel from each image, which are actually 4 integer numbers. These numbers are compared, for example to determine if CO<CD1.

Block 440: If this comparison is correct, a signal is now sent to the selector to select the original input HT image and the first dilated HT image, such that the signal word is now set to '0'.

Block 450: If this comparison is not correct, the default response is to send a signal to the selector to select the second dilated HT image and the first dilated HT image such that the value of the word in the signal information which corresponds to the current pixel location has a value of 1.

Block 460: Now two words have been selected, designated as C1 and C2.

Block 470: The words of the color converted CT image and the two selected CT image are numbers, enabling the following formula to be calculated: (CO−C1)/(C2−C1). The formula must be calculated using non-integer arithmetics, such as floating point or fixed point arithmetics so that the result is a value ranging from 0 to 1, and is therefore not an integer. This value may be scaled by any factor or otherwise coded as an integer, if desired. This value is 'W', the weight. If the value is not between 0 and 1, inclusive, then it is adjusted to the nearest end of the range. For example, if it is greater than one, the value is adjusted to be one.

This process is repeated until all of the image has been scanned. The method of scanning itself is not important, and can be line by line, row by row, or whatever is desired.

In the more general case, of a multi-separation image, there needs to be an iteration over the separation. The most efficient implementation depends upon the details of the coding of the image. For example, one implementation iterates the whole algorithm, as depicted in FIG. 4A, for each separation, and solves the problem separation by separation.

Furthermore, all of the functional steps described above can be implemented as an apparatus composed of a plurality of components, each of which performs one function of the method. It should be noted that these components are intended only as "virtual components" rather than as discrete physical entities.

For example, according to the present invention, there is provided an apparatus for color converting an original HT (halftone) image to a color converted HT image. In one embodiment, the apparatus includes a relator for determining a relation between a density of the original HT image and a density of the color converted HT image, and a dilator for dilating the original HT image according to a function of the relation to obtain the color converted HT image.

The dilator preferably includes a first dilating filter for dilating the original HT image to obtain a dilated HT image, a comparator for comparing a region of the original HT image and a region of the dilated HT image according to a comparison process, each of the regions corresponding to a pixel of the original HT image or of the dilated HT image and a selector for selecting one of the pixel of the original HT image or the pixel of the dilated HT image to form a selected is pixel, the selected pixel forming at least a portion of the color converted HT image.

The comparator preferably includes a first descreener for descreening the original HT image to produce a first CT (continuous tone) image; a second descreener for descreening the dilated HT image to produce a second CT image; a color converter for performing a color conversion process on the first CT image according to the desired color conversion to produce a color converted CT image; a sub-comparator for comparing each pixel of the color converted CT image, the second CT image and the first CT image to select a CT image pixel from one of the second CT image and the first CT image; and a merger for merging each pixel of the original HT image and the first dilated HT image according to the selected CT image pixel to produce the color converted HT image.

Similarly, the sub-comparator preferably further includes an obtainer for obtaining a pixel from an equivalent coordinate location in the original HT image, the pixel being H1, and in the first dilated image, the pixel being H2; a calculator for calculating a weight value for the H1 and the H2, and for calculating a variable within a same range as the weight value; and a variable/weight value comparator for comparing the variable and the weight value to produce a result, such that if the result is false, H2 is selected as the selected pixel and such that if the result is true, H1 is selected as the selected pixel.

The calculator preferably further includes a second obtainer for obtaining a value for a pixel from the equivalent coordinate location in the converted CT image, the value being designated as "CO"; a third obtainer for obtaining a value for a pixel from the equivalent coordinate location in the first CT image, the value being designated as "C1"; a fourth obtainer for obtaining a value for a pixel from the equivalent coordinate location in the second CT image, the value being designated as "C2"; a subtractor for subtracting C1 from CO to form a first difference and for subtracting C1 from C2 to form a second difference; and a ratio calculator for calculating a ratio of the first difference and the second difference, the ratio being the weight value.

What is claimed:

1. A method for color converting an original HT (halftone) image to a color converted HT image, the method comprising the step of dilating the original HT image according to a function of a relation between a density of the original HT image and a density of the color converted HT image to obtain the color converted HT image.

2. The method of claim 1, wherein the step of dilating further comprises the steps of:

(a) dilating the original HT image to obtain a dilated HT image;

(b) comparing a region of the original HT image and a region of said dilated HT image according to a comparison process, each of said regions corresponding to a pixel of the original HT image or of said dilated HT image; and (c) selecting one of said pixel of the original HT image or said pixel of said dilated HT image to form a selected pixel, said selected pixel forming at least a portion of the color converted HT image.

3. The method of claim 2, wherein said comparison process further comprises the steps of:

(i) descreening the original HT image to produce a first CT (continuous tone) image;

(ii) descreening said dilated HT image to produce a second CT image;

(iii) performing a color conversion process on said first CT image according to the desired color conversion to produce a color converted CT image;

(iv) comparing each pixel of said color converted CT image, said second CT image and said first CT image to select a CT image pixel from one of said second CT image and said first CT image; and wherein the step of selecting is performed by (v) merging each pixel of the original HT image and said first dilated HT image according to said selected CT image pixel to produce the color converted HT image.

4. The method of claim 3, wherein the step of comparing said converted CT image, said second CT image and said first CT image further comprises the steps of:

(1) obtaining a pixel from an equivalent coordinate location in the original HT image, said pixel being H1, and in said first dilated image, said pixel being H2;

(2) calculating a weight value for said H1 and said H2;

(3) calculating a variable within a same range as said weight value; and (4) comparing said variable and said weight value to produce a result, such that if said result is false, H2 is selected as said selected pixel and such that if said result is true, H1 is selected as said selected pixel.

5. The method of claim 4, wherein the step of calculating said variable is performed by obtaining said variable from a random number generator.

6. The method of claim 4, wherein the step of calculating said variable is performed according to said equivalent coordinate location of said pixel.

7. The method of claim 4, wherein the step of calculating said variable is performed once per each continuous plurality of pixels in said HT images.

8. The method of claim 4, wherein the step of calculating said weight value further comprises the steps of:

(A) obtaining a value for a pixel from said equivalent coordinate location in said converted CT image, said value being designated as "C";

(B) obtaining a value for a pixel from said equivalent coordinate location in said first CT image, said value being designated as "C1";

(C) obtaining a value for a pixel from said equivalent coordinate location in said second CT image, said value being designated as "C2";

(D) subtracting C1 from C0 to form a first difference;

(E) subtracting C1 from C2 to form a second difference; and (F) calculating a ratio of said first difference to said second difference, said ratio being said weight value.

9. The method of claim 2, wherein said comparison process further comprises the steps of:

(i) descreening the original HT image to produce a first CT (continuous tone) image;

(ii) descreening said dilated HT image to produce a second CT image;

(iii) performing a color conversion process on said first CT image according to the desired color conversion to produce a color converted CT image;

(iv) dilating said first dilated HT image to produce a second dilated HT image;

(v) descreening said second dilated HT image to produce a third CT image;

(vi) comparing each pixel of said converted CT image, said second CT image, said third CT image and said first CT image to select a pixel from one of said second CT image, said third CT image and said first CT image; and (vii) merging each pixel of the original HT image, said second dilated HT image and said first dilated HT image according to said selected pixel to produce the color converted HT image.

10. The method of claim 9, wherein the step of comparing further comprises the steps of:

(1) obtaining a first pixel from one of the original HT image, said second dilated HT image, said first eroded HT image and said first dilated HT image to a first output HT image according to said selected pixel; and (2) obtaining a second pixel from the original HT image, said second dilated HT image, said first eroded HT image and said first dilated HT image to a second output HT image according to said selected pixel.

11. The method of claim 2, wherein said comparison process further comprises the steps of:

(i) descreening the original HT image to produce a first CT (continuous tone) image;

(ii) descreening said dilated HT image to produce a second CT image;

(iii) performing a color conversion process on said first CT image according to the desired color conversion to produce a color converted CT image;

(iv) dilating said first dilated HT image to produce a second dilated HT image;

(v) descreening said second dilated HT image to produce a third CT image;

(vi) eroding the original HT image to produce an eroded HT image;

(vii) descreening said eroded HT image to produce a fourth CT image;

(viii) comparing each pixel of said converted CT image, said second CT image, said third CT image, said fourth CT image and said first CT image to select a pixel from one of said second CT image, said third CT image, said fourth CT image and said first CT image; and (ix) merging each pixel of the original HT image, said second dilated HT image, said first eroded HT image and said first dilated HT image according to said selected pixel to produce the color converted HT image.

12. The method of claim 11, wherein the step of comparing further comprises the steps of:

(1) obtaining a first pixel from one of the original HT image, said second dilated HT image, said first eroded HT image and said first dilated HT image to a first output HT image according to said selected pixel; and (2) obtaining a second pixel from the original HT image, said second dilated HT image, said first eroded HT image and said first dilated HT image to a second output HT image according to said selected pixel, such that two output HT images are produced.

13. The method of claim 12, wherein the step of comparing further comprises the steps of:

(3) calculating a weight value for said first pixel and said second pixel;

(4) calculating a variable within a same range as said weight value; and (5) comparing said variable and said weight value to produce a result, such that if said result is false, said second pixel is selected as said selected pixel and such that if said result is true, said first pixel is selected as said selected pixel.

14. The method of claim 13, wherein the step of calculating said variable is performed by obtaining said variable from a random number generator.

15. The method of claim 13, wherein the step of calculating said variable is performed according to said equivalent coordinate location of said pixel.

16. The method of claim 13, wherein the step of calculating said variable is performed once per each continuous plurality of pixels in said HT images.

17. An apparatus for color converting an original HT (halftone) image to a color converted HT image, comprising:
(a) a relator for determining a relation between a density of the original HT image and a density of the color converted HT image; and
(b) a dilator for dilating the original HT image according to a function of said relation to obtain the color converted HT image.

18. The apparatus of claim 17, wherein said dilator further comprises:
(i) a first dilating filter for dilating the original HT image to obtain a dilated HT image;
(ii) a comparator for comparing a region of the original HT image and a region of said dilated HT image according to a comparison process, each of said regions corresponding to a pixel of the original HT image or of said dilated HT image; and
(iii) a selector for selecting one of said pixel of the original HT image or said pixel of said dilated HT image to form a selected pixel, said selected pixel forming at least a portion of the color converted HT image.

19. The apparatus of claim 18, wherein said comparator further comprises:
(1) a first descreener for descreening the original HT image to produce a first CT (continuous tone) image;
(2) a second descreener for descreening said dilated HT image to produce a second CT image;
(3) a color converter for performing a color conversion process on said first CT image according to the desired color conversion to produce a color converted CT image;
(4) a sub-comparator for comparing each pixel of said color converted CT image, said second CT image and said first CT image to select a CT image pixel from one of said second CT image and said first CT image; and
(5) a merger for merging each pixel of the original HT image and said first dilated HT image according to said selected CT image pixel to produce the color converted HT image.

20. The apparatus of claim 19, wherein said sub-comparator further comprises:
(A) an obtainer for obtaining a pixel from an equivalent coordinate location in the original HT image, said pixel being H1, and in said first dilated image, said pixel being H2;
(B) a calculator for calculating a weight value for said H1 and said H2, and for calculating a variable within a same range as said weight value; and
(C) a variable/weight value comparator for comparing said variable and said weight value to produce a result, such that if said result is false, H2 is selected as said selected pixel and such that if said result is true, H1 is selected as said selected pixel.

21. The apparatus of claim 20, wherein said calculator further comprises:
(I) a second obtainer for obtaining a value for a pixel from said equivalent coordinate location in said converted CT image, said value being designated as "CO";
(II) a third obtainer for obtaining a value for a pixel from said equivalent coordinate location in said first CT image, said value being designated as "C1";
(III) a fourth obtainer for obtaining a value for a pixel from said equivalent coordinate location in said second CT image, said value being designated as "C2";
(IV) a subtractor for subtracting C1 from CO to form a first difference, and for subtracting C1 from C2 to form a second difference; and
(V) a ratio calculator for calculating a ratio of said first difference to said second difference, said ratio being said weight value.

* * * * *